(No Model.) 2 Sheets—Sheet 1.
J. Y. & A. SAVAGE.
COMBINED FERTILIZER DISTRIBUTER AND STALK BREAKER.
No. 333,164. Patented Dec. 29, 1885.
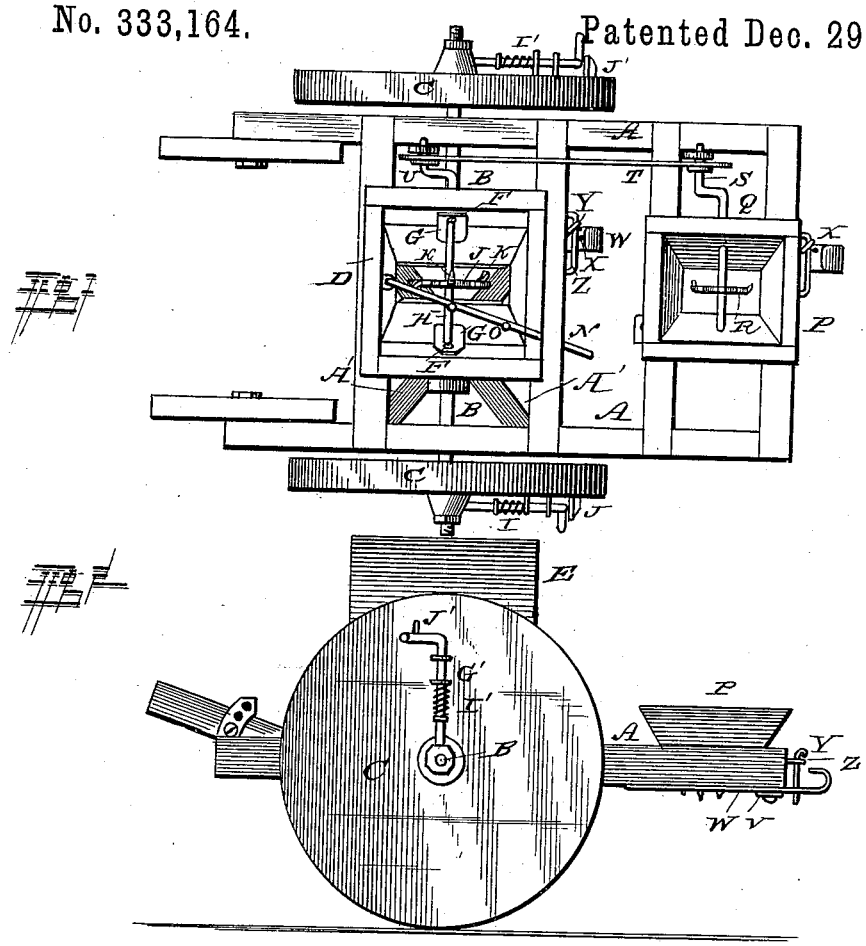
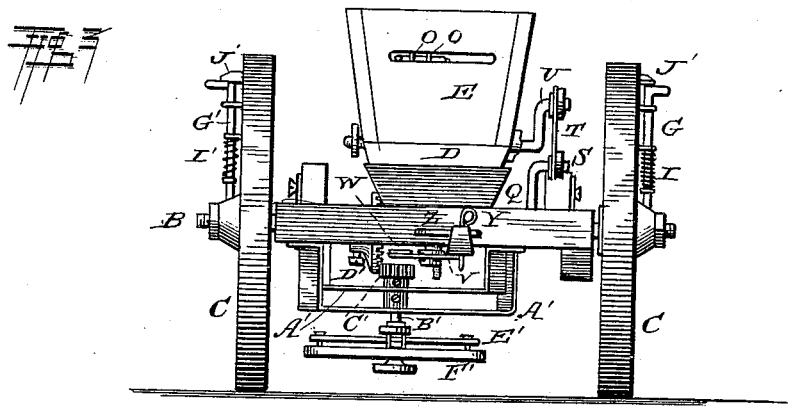
WITNESSES:
Fred. G. Dieterich.
Wm. Bagger
INVENTORS:
John Y. Savage & Andrew Savage,
by Louis Bagger & Co.
ATTORNEYS.
N. PETERS, Photo-Lithographer, Washington, D. C.

(No Model.) 2 Sheets—Sheet 2.
J. Y. & A. SAVAGE.
COMBINED FERTILIZER DISTRIBUTER AND STALK BREAKER.
No. 333,164. Patented Dec. 29, 1885.
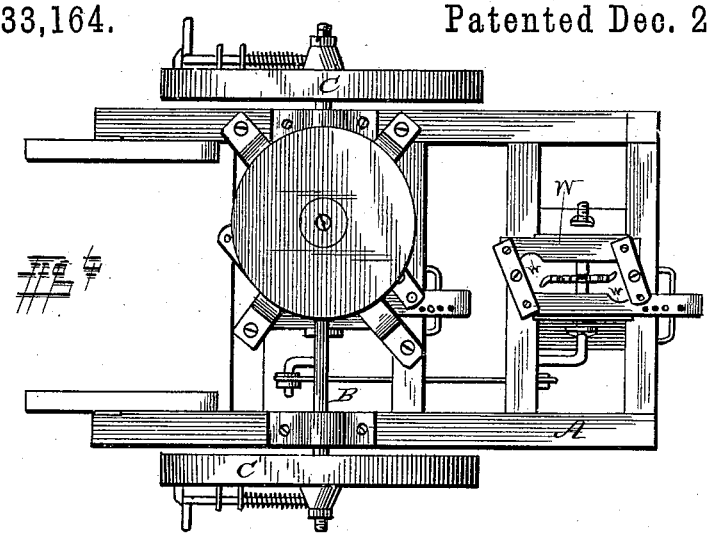
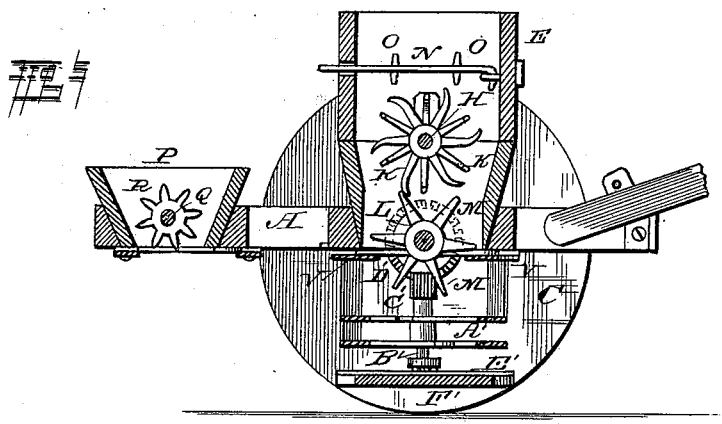
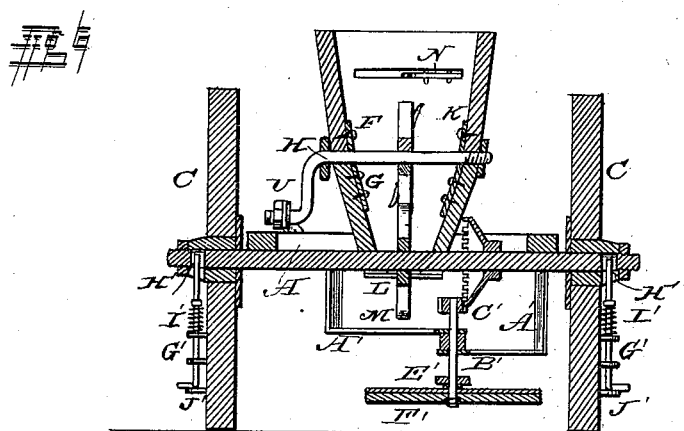

UNITED STATES PATENT OFFICE.

JOHN Y. SAVAGE AND ANDREW SAVAGE, OF SCOTLAND NECK, N. C.

COMBINED FERTILIZER-DISTRIBUTER AND STALK-BREAKER.

SPECIFICATION forming part of Letters Patent No. 333,164, dated December 29, 1885.

Application filed June 14, 1884. Serial No. 134,821. (No model.)

*To all whom it may concern:*

Be it known that we, JOHN Y. SAVAGE and ANDREW SAVAGE, citizens of the United States, and residents of Scotland Neck, in the county of Halifax and State of North Carolina, have invented certain new and useful Improvements in a Combined Fertilizer-Distributer and Stalk-Breaker; and we do hereby declare that the following is a full, clear, and exact description of the invention, which will enable others skilled in the art to which it appertains to make and use the same, reference being had to the accompanying drawings, which form a part of this specification, and in which—

Figure 1 is a plan view of our improved fertilizer-distributer. Fig. 2 is a side view of the same. Fig. 3 is a rear view. Fig. 4 is a bottom view. Fig. 5 is a longitudinal vertical sectional view, and Fig. 6 is a transverse sectional view taken through the axle of the machine.

The same letters refer to the same parts in all the figures.

This invention relates to machines for distributing fertilizing material, either compost or guano, or both, and either in drills or broadcast, and a part of which may be converted into a convenient and efficient stalk-breaker; and it has for its object to produce a device which shall possess superior advantages in point of simplicity, durability, and general efficiency.

To these ends it consists in certain improvements in the construction of the same, which will be hereinafter fully described, and particularly pointed out in the claims.

In the drawings hereto annexed, A designates the frame of the machine, which is mounted or supported upon an axle, B, having wheels C C, which are normally loose, but which may be secured to the axle, by means to be hereinafter described, so as to cause the axle to revolve in the frame for the purpose of actuating the operating mechanism. The front part of the frame supports a large hopper, D, the upper part of which is detachable for the purpose of regulating the capacity. The said detachable upper part, E, is secured, by means of screws or bolts F, to the ears G G, having bearings for a transverse shaft, H, having an agitating-disk, J, provided with arms each alternating in length, the points of the shorter ones being bent forward, so as to engage with and be operated by the arms M of the feed-wheel L, which is situated in the bottom of the hopper, and is secured to the shaft or axle B. The points of the longer arms K K are bent alternately to the right and left. It will thus be seen that the arms of the disk J do a triple duty—that is, they receive motion for its revolution, agitate or loosen the fertilizing material upon both sides of it, and convey the material so loosened to the feed-wheel at the bottom of the hopper. The upper part of the hopper has an additional agitator, consisting of a lever, N, pivoted detachably in an eyebolt in the front side of the hopper and working in a slot in its rear side. This lever is for the purpose of loosening the fertilizing material that becomes wedged or packed in the sides of the hopper beyond the reach of the arms K K of the wheel J. It is to be operated by hand, and can be removed when the hopper is being filled, and replaced when needed as the hopper becomes nearly empty. The rear part of the frame supports a small hopper, P, adapted to hold guano or prepared fertilizing material, and which may be used in conjunction with the compost-hopper; or its use may be dispensed with, if so desired. Said hopper has a transverse rock-shaft, Q, carrying a feed-wheel, R, having arms, the upper ones of which, or those that agitate the fertilizing material, are bent alternately to the right and left, while those that work in the feed-aperture are straight, and having at one end a crank, S, connected by a pitman, T, with a crank, U, upon the shaft H, from whence the said rock-shaft Q acquires a vibratory motion. By this arrangement a better result can be obtained than if the feed-wheel R made complete revolutions, for the backward and forward motion of the agitating-teeth through the fertilizing material will the more effectually prevent clogging, and will always keep the feed-teeth well supplied. These latter teeth being straight, the feed-aperture can be closed tighter than if they projected sidewise. Thus the quantity to be distributed can be the better regulated. The main frame is provided directly under the openings of the hoppers with feed-regulators consisting of frames comprising pivoted end pieces, V, to the ends of which are pivoted side pieces or cut-offs, W, one of which projects some distance in front, and is provided with perforations X to receive a check pin or bolt, Y, that may be inserted through a staple, Z, attached to the frame, so as to retain the feed-regulator in any position to which it may have been adjusted. These side pieces have notches cut in their inner sides, which permit them to come closer together than if they were not so cut. The operation of these devices is obvious, and will require no further explanation.

The under side of the front part of the frame is provided with cross-braces A' A', affording bearings for a vertical shaft, B', having at its upper end a pinion, C', engaging a pinion, D', upon the main shaft or axle of the machine. These cross-braces are placed diagonally under the frame, thus securing more strength to resist an obstruction in front, and one of them is placed lower than the other one, thus making a bearing at or near both ends of the shaft. The pinion C' has a collar at its lower portion in which is a set-screw that operates against the top of the shaft, thus enabling the shaft to be easily adjusted up or down. There is also a collar fitting the shaft between the cross-braces, which is also provided with a set-screw which helps to keep the shaft in place. The lower end of said shaft carries a metallic cross-frame, E', to which a disk or plate, F', may be detachably secured in any suitable manner. When the machine is to be utilized for scattering the manure broadcast, this disk is retained, and the manure dropping from the hopper upon it will be scattered evenly over the field. The cross-frame to which the disk is secured assists the disk in throwing the fertilizing material farther than could be done if the disk were smooth. When the disk is removed, the revolving arms of the metallic cross-frame form an admirable stalk-breaker, and when desired the vertical shaft, with its attachments, may be entirely removed, so as not to interfere with the drilling of the manure.

Covering-plows may be used, when desired, and the front end of the frame is to be provided with a tongue or shafts for the attachment of draft.

For the purpose of attaching the wheels to the axle, so as to cause the latter to revolve and the machine to operate, we prefer to avail ourselves of radially-sliding bolts G', mounted in eyebolts or staples upon the outer sides of the wheels, and passing through perforations H' in the hub and axle, where they are held by the action of suitably-arranged springs I'. When it is desired to turn at the end of the field, or to throw the machine out of operation, the bolts may be withdrawn and held out of engagement by adjusting their handles behind catches J', suitably attached to the faces of the wheels.

From the foregoing description, taken in connection with the drawings hereto annexed, the operation and advantages of this invention will be readily understood. The construction is simple and durable, the machine is easily operated and manipulated, and the operation is effective. It will be especially noticed that the manure may be deposited in drills, or broadcast, as may be desired; also, that the guano-hopper may be used or not, at the will of the operator, and, finally, that the broadcast mechanism may, when desired, be converted into a very efficient stalk-breaker.

We are aware that it is not broadly new to have a detachable upper portion to a hopper; neither to have agitator-wheels in the hopper of a fertilizing or sowing machine; or to have parallel pivoted boards closing the outlets of seed or fertilizer hoppers, and we do not wish to claim such constructions; but

We claim—

1. The combination, with a frame hung on a revolving-axle having a hopper over said axle, of a spurred feed-wheel secured to said axle, and a spurred agitating-wheel secured in said hopper over said feed-wheel, having the point of each alternate spur or arm bent forward, so as to engage with the spurs of the feed-wheel, and the points of the remaining arms or spurs bent alternately to the right and left, substantially as and for the purpose set forth.

2. The combination, in a fertilizer-distributer, of a frame having a suitable hopper and feed mechanism, of two suspended cross-braces secured to the under side of said frame, a shaft passing vertically through bearings in said cross-braces, a horizontal disk secured to the bottom of said shaft, a collar secured adjustably to the top of said shaft, a collar secured near its central portion between the two cross-braces, and suitable mechanism for revolving said shaft and disk, substantially as and for the purpose set forth.

3. The combination, with a frame hung on a revolving axle, of two cross-braces secured to the under side of said frame, a shaft passing through bearings in said cross-braces, a frame secured to the bottom of said shaft, having extended arms, a collar adjustably secured to the top of said shaft, a movable collar secured near its central portion between said cross-braces, and suitable mechanism for revolving said shaft and arms, substantially as and for the purpose set forth.

In testimony that we claim the foregoing as our own we have hereunto affixed our signatures in presence of two witnesses.

JOHN Y. SAVAGE.
ANDREW SAVAGE.

Witnesses:
JNO. H. SPEED,
W. C. PENDLETON.